May 4, 1926.

G. K. ATKINSON

VEHICLE MOUNTING

Filed Nov. 8, 1923

1,583,106

INVENTOR:
George K. Atkinson,
BY
Arthur Jenkins.
ATTORNEY.

Patented May 4, 1926.

1,583,106

UNITED STATES PATENT OFFICE.

GEORGE K. ATKINSON, OF AURORA, INDIANA.

VEHICLE MOUNTING.

Application filed November 8, 1923. Serial No. 673,544.

*To all whom it may concern:*

Be it known that I, GEORGE K. ATKINSON, a citizen of the United States, and a resident of Aurora, in the county of Dearborn and State of Indiana, have invented new and Improved Vehicle Mountings, of which the following is a specification.

My invention relates to the class of devices employed for yieldingly supporting loads, and especially for supporting the bodies of vehicles and an object of my invention, among others, is to provide a device or devices of this class by the use of which transmission to the vehicle body of vibrations caused by the passage of the wheels of the vehicle over uneven surfaces shall be reduced to a minimum degree; and a further object of the invention is to provide a device of this class that shall be particularly effective in operation.

One form of device embodying my invention and in the construction and use of which the objects herein set out, as well as others, may be attained, is illustrated in the accompanying drawings, in which—

Figure 1:
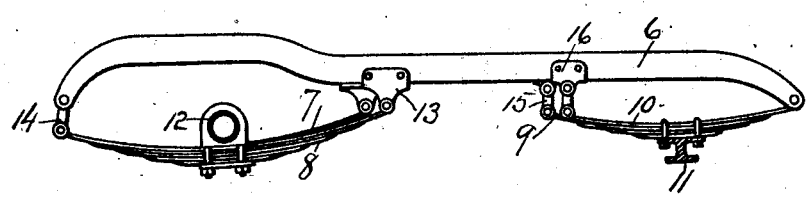
Figure 1 is a view in side elevation of the frame and springs comprising a portion of the chassis of a motor vehicle.
Figure 2:
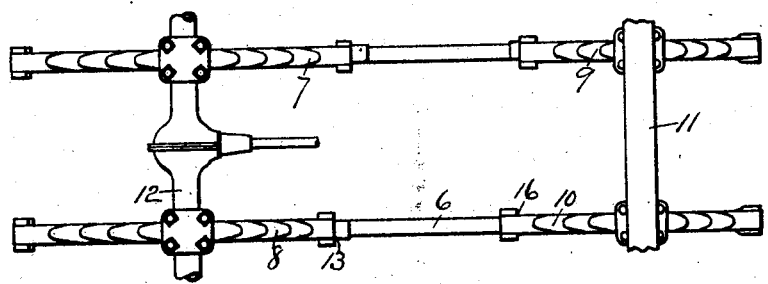
Figure 2 is a bottom view of the same including the housing for the differential.

In the use of motor vehicles as constructed at the present time the springs are so arranged that when the wheels of the vehicle are passing over uneven surfaces a more or less synchronous action of such springs takes place, with a result that the movements of the vehicle body are increased, and this is especially true when the uneven surface is more or less regular on opposite sides of the vehicle, or when such uneven surfaces are spaced with much regularity in the direction of travel. By the use of my improved means for supporting the bodies of vehicles I have so arranged the parts that the tendency otherwise to synchronous action in the transmission of vibrations is interrupted and broken up, the action of each of the spring-supports being opposed and disconcerted with respect to the action of the other spring-supports so far as the transmission of vibration is concerned.

That form of structure embodying my invention and which I have selected for the purpose of its disclosure herein comprises spring-supports that, individually, may be of any ordinary form and construction and that may be attached to the frame 6 of the vehicle in any ordinary manner. These springs 7—8—9—10 are secured in any suitable manner to a front axle 11 and a rear axle or housing 12. The springs 7—8 are secured at their front end to brackets 13 and are connected to the frame at their rear ends as by means of shackles 14, while the front springs 9—10 are pivotally secured at their front ends to the front ends of the frame and are secured at their rear ends by means of shackles 15 to brackets 16 in any ordinary and well known manner.

In order to cause these springs to each counteract the tendency to transmission of vibration by the other springs, I so construct such springs that each is of a different length, or has a different degree of stiffness from each of the other springs, in the preferred form of construction different lengths of springs being employed by me, and from which it will be noted by reference to the drawings, that the spring 7 is longer than the spring 8, and the spring 10 is longer than the spring 9, both of the springs 9 and 10 being shorter than the springs 7 and 8. The arrangement to obtain this difference in the length of springs or in the stiffness thereof may be varied to any degree desired, that is, all of the springs may be different in the respects mentioned, or the front springs and the rear springs may be alike, but different as to the two pairs, and I do not, therefore, limit my invention to any structure embodying a definite arrangement.

In accordance with the provisions of the patent statutes I have described the principles of operation of my invention, together with the device which I now consider to represent the best embodiment thereof; but I desire to have it understood that the device shown is only illustrative and that the invention may be carried out by other means.

I claim—

1. A vehicle frame mounting including a plurality of springs secured to a support and each attached at one end to a body member, the opposite ends of said springs being attached to said body member on different lines extending crosswise of the body at right angles to the longitudinal center thereof.

2. A vehicle frame mounting including a spring suspension of at least four springs arranged in pairs with their center supports transversely alined, and each of said springs being of a different length.

3. A vehicle frame mounting including pairs of front and rear springs with the springs of each pair disposed on opposite sides of the vehicle frame, and the springs of each pair being of different lengths.

4. A vehicle frame mounting including pairs of front and rear springs, with the springs of each pair disposed on opposite sides of the vehicle frame and with their center supports transversely alined and the springs of each pair being of different lengths, with the shorter one of the rear pair of springs being of greater length than the longer one of the front pair of springs.

GEORGE K. ATKINSON.